United States Patent [19]

Kadkade

[11] 4,109,414

[45] Aug. 29, 1978

[54] CONTROL OF PLANTS ABSCISSION PROCESSES BY USING SPECIFIC LIGHT SOURCES

[75] Inventor: Prakash G. Kadkade, Marlborough, Mass.

[73] Assignee: GTE Laboratories Incorporated, Waltham, Mass.

[21] Appl. No.: 832,407

[22] Filed: Sep. 12, 1977

Related U.S. Application Data

[63] Continuation-in-part of Ser. No. 701,331, Jun. 30, 1976, abandoned.

[51] Int. Cl.² .............................................. A01G 1/00
[52] U.S. Cl. .................................... 47/58; 47/DIG. 6
[58] Field of Search .............................. 47/58, DIG. 6

[56] References Cited

U.S. PATENT DOCUMENTS 3,340,648  9/1967  Frantzen ................................. 47/58
4,060,933  12/1977  Kadkade ............................... 47/58

Primary Examiner—Robert E. Bagwill
Attorney, Agent, or Firm—Fred Fisher

[57] ABSTRACT

A method is disclosed for controlling the abscission of plant parts by illuminating the plants during night periods with light having a wavelength selected from the group consisting of wavelengths in the order of 420nm, 550nm, 660nm and 740nm.

13 Claims, 1 Drawing Figure

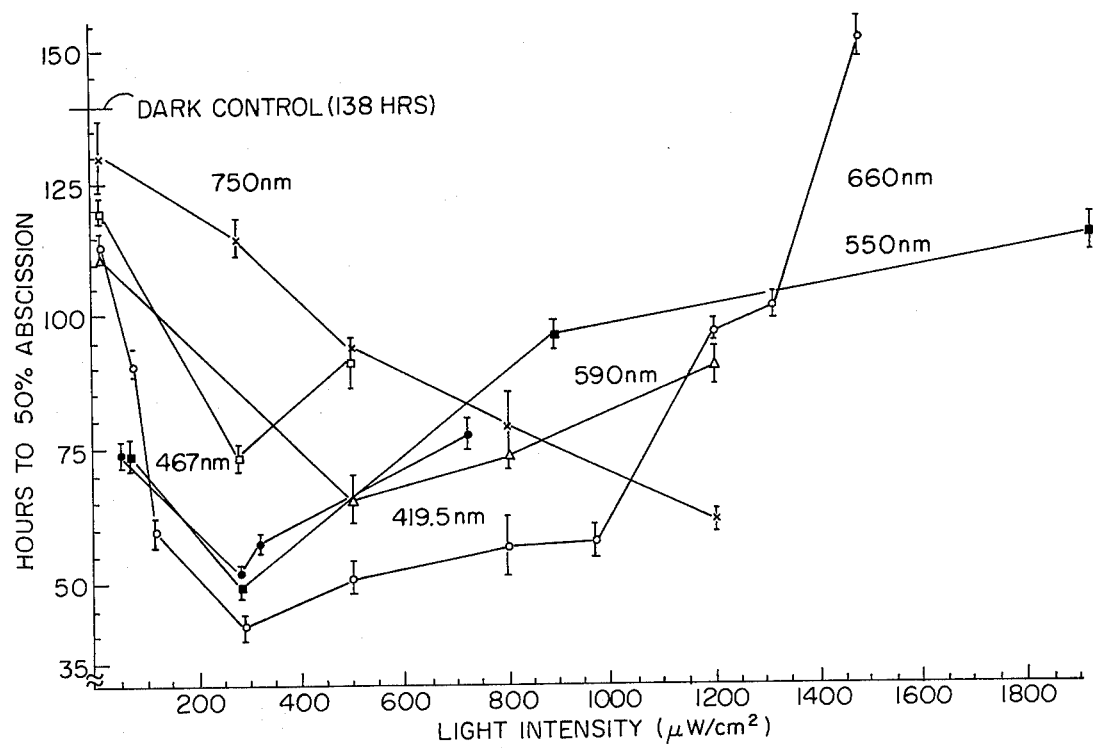

CONTROL OF PLANTS ABSCISSION PROCESSES BY USING SPECIFIC LIGHT SOURCES

CROSS REFERENCE TO RELATED APPLICATION

This is a continuation-in-part of application Ser. No. 701,331, filed June 30, 1976 (now abandoned).

BACKGROUND OF THE INVENTION

1. Field of the Invention

This invention relates to plant husbandry and, more specifically, to a method for controlling the abscission of plant parts such as stems, leaves, flowers and fruits. The need to control abscission arises in a wide variety of applications ranging from agriculture to ornamental plant cultivation.

A major concern in agriculture is the maximization of crop yield, especially in areas where suitable land is limited. Thus, it is desirable in orchards, for example, to delay the abscission of fruit and thereby prevent preharvest dropping. The harvest period may consequently be stretched to reduce the work pace and to minimize the quantity of harvested produce needed to be stored prior to shipment. Similarly, the number of pod initiations generated in leguminous crops, such as soybeans, may be greatly increased by delaying the abscission of its flowers to maximize total flower pollinization.

On the other hand, crop yields may be increased by timely promoting the abscission process. Mechanically harvested fruit, for example, which is too firmly attached to the plant may leave a firmly attached piece behind on the stem and be subsequently susceptible to contamination. It is, therefore, desirable just before harvest to "loosen" the fruit by controllably promoting the abscission process.

In addition to crop production, controllable abscission of ornamental plants is desirable. The promotion of leaf abscission may increase the density at which, and enhance the ease with which, the plants may be stored or transported. In contrast, however, it is desirable to retard the abscission of the petals of cut flowers to increase their allowable storage time prior to sale or use.

2. Description of the Prior Art

Abscission regulators of the prior art have consisted of a wide variety of chemical sprays, the composition of which differ with plant type and in accordance with the desire to delay or promote the abscission process.

There are many disadvantages associated with the use of chemical abscission agents. Many leave potentially harmful residues on the plant, the fruit, and in the soil, and some such as maleic hydrazide, dichlorophenoxyacetic acid, and 2, 4, 5-trichlorophenoxyacetic acid are highly toxic.

The chemical agents are vulnerable to inclement weather, and require a dry period in which to penetrate the plant or leaf skin if respraying is to be avoided. Because many are not biodegradable, residual effects of the regulators are carried for a long period in both the soil and plant system, and the levels of chemical residue may increase with repeated use of the agent.

Most chemical abscission promoters which remain in the soil additionally retard the subsequent seasons' growth of plants by retarding root formation and inhibiting the uptaking of nutrients. Additionally, the aging process of subsequently formed leaves is enhanced so that plant growth is further inhibited by premature defoliation. Finally, by prematurely stimulating bud formation, these promoters cause premature blossoming on plants having late forming buds which would otherwise develop the following season. Thus, flowers which would normally form in Autumn and provide fruit during the following growing season are now initiated as early as Spring, to the detriment of the following growing season's yield. Yield is further reduced by the inadvertent abscission of shoots which thereby reduce the quantity of born fruit.

Crops treated with chemical abscission promoters may undergo abscission before true maturity. In the chemical hastening of the ripening process of tomatoes, for example, the color is changed by the stimulation of certain enzymes, but the tomato remains high with alkaloids, generating a bitter taste and decreasing its shelf life.

The nutritional value of the chemically treated crop may also be detrimentally affected. A decrease in the calcium content of apples has been attributed to the lowering of soil pH by chemical abscission agents. It may be noted that the firmness of the fruit, as well as its nutritive value, depends on its calcium content, so that the quality of the fruit, as well as its ability to remain on the tree until full maturity, are both adversely affected.

Finally, the acidic nature of some chemical abscission agents create lesions and extensive peel injury on the fruit, particularly to citruses.

In summary, it may be seen from the foregoing that such agents often interfere with normal plant development and growth.

It might be contended that "Further Studies in Photoperiodism . . . ", Garner et al. *Journal of Agric. Res.*, U.S.D.A., March 1923, pp. 871–3, 901–9, 914–19 (copy in art unit 337) might be relied on to teach the promotion and inhibition of abscission by illumination of plants "during the night period". The subject matter of such reference concerns the absicssion process which occurs just prior to the dormant stage of a plant. That abscission process is dependent upon photosynthesis by the plant and is triggered by the length of daylight and temperature. The reference artificially varies daylight length via broad spectra lighting to determine the effect upon leaf loss. As is known in the art, shorter days preclude deciduous plants from deriving sufficient nutrients via photosynthesis. Consequently, the leaves are shed in order to contain nutrients within the more vital plant areas and, typically, the plant enters a dormant period.

In contrast to the reference, the invention herein relates to the "physiological" abscission process, after which active cell division in the abscission zone continues. Physiological abscission is related to hormone changes within the plant, rather than losses of nutrients. One may contrast the two types of abscission by the fact that the reference, in lengthening the daylight period, alters and extends the growth of the plant by keeping it from reaching its dormant state. By contrast, the present invention inhibits, or prolongs physiological abscission without altering the natural growth limitation of the plant. For example, extension of the daylight period will not prevent apple trees from dropping their apples. The tree will simply not enter dormancy at its usual time.

By its extension of daylight, the Garner et al. reference does not utilize narrow bandwidth lights having predominate spectral emission of the wavelengths indicated herein. There is certainly no suggestion that low intensity illumination may produce the results described herein. Finally, the reference does not suggest the use of a night interruption technique whereby the plant is illuminated subsequent to the initiation of the dark period.

SUMMARY OF THE INVENTION

It is, therefore, an object of the present invention to control plant abscission without the need for chemical agents.

It is another object of the invention to regulate plant abscission in a precise manner.

It is still another object of the invention to control plant abscission without the detrimental side effects enumerated above.

It is a further object of the invention to control the abscission process without a wide variety of controlling agents.

These and other objects and advantages of the invention are accomplished by illuminating the plants during the night with artificial light having wavelength components selected from 420nm, 550nm, 660nm, and 740nm. The specific wavelength depends upon whether the promotion or inhibition of the abscission process is desirable, and upon the intensity of the narrowband light. As will be more fully explained below, the light intensity, the duration of illumination, and the schedule of illumination are dependent upon factors such as the type of plant and its stage of development.

Although the mechanism by which the light affects the abscission process may not be explained with complete certainty, it is theorized that the phytochrome system of the plant, which has absorption peaks corresponding to the utilized wavelength components, is either directly or indirectly involved. Light energy is absorbed either by the phytochrome, or by another photoreceptor and transferred to the phytochrome, and either stimulates or retards the synthesis of certain abscission-causing enzymes. The enzymes may be synthetic, that is to say built from protein molecules, or degradative wherein the protein is degraded into amino acids, and include cellulase, pectinase, and polygalacturonase which break down the cellulose and pectin of the plant cell walls, and proteolytic and lipoytic enzymes for breaking down the plant cell membranes. Similarly, retardation of abscission occurs when the wavelength of the light prevents synthesis of hormones, such as ethylene and absisic acid, precluding synthesis of the degradative enzymes.

An alternate theory maintains that the light respectively inhibits or enhances the translocation of hormones to the abscission area from the portion of the plant system in which they are produced.

As will become more clear in the examples set forth below, the abscission process may be regulated by either continuous or brief exposures of a plant to low intensity light ($<300\mu W/cm^2$) of appropriate wavelength over a period which varies, from several days to several weeks, with parameters such as total light energy and plant species. The total light energy is simply the product of the duration and intensity of the illumination. The exposure period required to inhibit or promote the abscission process is generally inversely proportional to the total applied light energy when low intensity light is used.

As indicated above, the required exposure period may additionally vary with the plant species or subspecies owing to the individual characteristics associated with each plant's biosystem. Cooking apples, for example, contain greater quantities of pectin than other apple varieties, and their abscission accordingly requires higher levels of pectin-degrading enzymes and, consequently, a correspondingly greater amount of total light energy.

The desired choice between delay and promotion of the abscission process is predominantly a matter of utilizing the appropriate wavelength of light at a particular plant growth stage. It is convenient to discuss the growth stage in terms indicated in "Physiological Processes Involved in Abscission" by A. C. Leopold, *HORTSCIENCE*, Vol. 6 (4), pg. 24 et seq. As indicated therein, five morphological stages in the abscission process of climacteric plants are identifiable:

(1) differentiation of an abscission zone;
(2) A first period (Stage I) wherein the plant maintains a substantially high auxin level. During this period, the addition of auxin defers abscission, weakening of the break strength in the abscission zone occurs.
(3) a second period (Stage II) during which the structural strength at the abscission zone weakens: Endogenous auxin levels decline in the abscission zone and substantial amounts of ethylene are generated. The addition of auxin promotes abscission.
(4) separation; and
(5) healing.

If the plant is illuminated during Stage I, as where preharvest drop is to be minimized, with light of an appropriate wavelength, the abscission process is inhibited. Abscission promotion, on the other hand, is generated by illumination during Stage II, as where fruit is loosened during the period just prior to harvest.

While the foregoing discussion is general in nature, more specific features and advantages of the invention will be apparent from the following examples, which demonstrate the effects and parameters of the abscission regulating process in conjunction with a variety of plants. The examples set forth below are to read together with the following drawing.

DESCRIPTION OF THE DRAWING

The FIGURE is a graphic illustration showing the relationship between light intensity and bean petiole abscission time for a variety of wavelengths of light.

EXAMPLE I

Bean (*Phaesolus Vulgaris* 'Var. Burpees Brittle')

The primary leaves of uniform bean seedlings were excised, and the blades trimmed off. The petioles were then cut by a sharp razor blade so that the abscission zone was in the center of the explant, with the pulvinus and about 1mm of the mid-rib tissue on the distal side of the abscission zone and 5mm of the petiole on the proximal side. The explants were inserted vertically, with the proximal petiole end down, to a depth of 4mm in a 1% agar solution in a petri dish. In general, abscission counts were made periodically and the time required for 50% abscission was recorded. Abscission resulted either naturally or after application of slight pressure to the explants.

The relationship between abscission time and light intensity was first determined by recording the mean time to 50% abscission for groups, having six replicates, which were continuously illuminated by a particular intensity and wavelength of light. Light intensities were controlled by adjusting the distances between the lights and the petri dishes and were measured by a means of a Tektronix J-16 photometer/radiometer at the lid of the petri dish. A Tektronix J-6512 probe was utilized in conjunction with the photometer. Because the silicon sensors used by the probe were maximally sensitive below 450nm, correction factors of 6.25 at 371nm and 1.19 at 419.5nm, obtained from Tektronix, were used.

Light was obtained from narrow bandwidth fluorescent lamps having peak wavelengths at 371nm, 419.5nm, 467nm, 550nm, 660nm and 750nm. To eliminate near-ultraviolet mercury-line emission, in all but the 371nm lights, the lights were covered with a 5 mil thickness of Weatherable ™ polyester film obtained from the Martin Processing Company, Martinsville, VA. and which, in turn, was surrounded by selected Kliegel cinemoid filters which absorb the visible mercury lines which were remote from the immediate spectral region of the narrow-band phosphor emissions. The FIGURE graphically illustrates the results from the wavelengths of interest. As shown in the FIGURE and with the exception of 750nm light, the highest and the lowest intensities were generally less effective in promoting abscission than the intermediate intensities ranging from 150 $\mu W/cm^2$–500 $\mu W/cm^2$. The intensity of the 750nm source, however, had an overall inverse relationship with the 50% abscission time, with maximum promotion of abscission occurring at 1200 $\mu W/cm^2$. Since red light at 660nm was most effective in the promotion of abscission, it was utilized in the remaining experiments.

To enhance the efficiency of the process, it may be desirable to obtain maximum abscission promotion by illuminating the plants for the briefest possible duration. Accordingly, the relation between abscission time and illumination with varying durations of 280 $\mu W/cm^2$, 660nm light was determined for comparison with the data of the FIGURE by subjecting six replicates of 10 explants each to the 660nm light immediately after deblading and maintaining them thereafter in the dark until 50% abscission occurred. The mean time to 50% abscission is shown below in Table I and compared to a control group which was totally maintained in the dark.

TABLE I

| DURATION (MIN.) | TIME TO 50% ABSCISSION (HRS.) |
|---|---|
| DARK CONTROL | 138 |
| 5 | 103 |
| 15 | 94 |
| 30 | 83 |
| 60 | 66 |
| 120 | 54 |

It may be observed that as little as 5 minutes of light exposure immediately after deblading produced some promotion of abscission while 2 hours of exposure promoted abscission nearly as much as produced by 42 hours of continuous exposure of the 660nm light as shown by comparison with the FIGURE.

Next, the effect of illuminating the explants immediately after deblading was investigated by maintaining a constant duration of light exposure (1 hour) and varying the light delivery from 0 to 40 hours after deblading. The mean times to 50% abscission for six replicates of 10 explants each were as follows:

TABLE II

| Dark Induction Time (hrs.) | Mean Time To 50% Abscission (hrs.) |
|---|---|
| 0 | 66 |
| 0.5 | 65 |
| 1.0 | 61 |
| 4.0 | 74 |
| 16.0 | 84 |
| 20.0 | 96 |
| 24.0 | 95 |
| 40.0 | 97 |

The data presented in Table II may be interpreted in two ways. First, it may be seen that regardless of the time of its application, the mean time to 50% abscission occurs at approximately constant intervals after illumination, the intervals being the abscission time less the induction time. Secondly, it may be appreciated from Table II that the abscission process, itself, is accelerated by earlier applications of the light.

Finally, the effects of night interruption on the abscission process were investigated by subjecting the plants to daily photoperiodic cycles of broad spectrum light and darkness and, as shown in Table III, interrupting the darkness at various times with 1 hour of 250 $\mu W/cm^2$, 660nm light.

For comparative purposes, three control groups were respectively subjected to constant "daytime", constant 660nm light, and an uninterrupted day cycle.

TABLE III

| | CYCLE | MEAN TIME TO 50% ABSCISSION (HRS.) |
|---|---|---|
| REF. | CONT. RED (660nm) | 45 |
| | CONT. BROAD SPECTRUM | 64 |
| | 14 HR. BROAD SPECTRUM + 10 HR. DARK | 71 |
| | 14 HR. BROAD 1 HR. RED 9 HR. DARK | 50 |
| | 14 HR. BROAD 4 HR. DARK 1 HR. RED 5 HRS. DARK | 51 |
| | 14 HR. BROAD 9 HR. DARK 1 HR. RED | 55 |

The promotion of abscission by night interruption, therefore, appears independent of the illumination schedule when 280 $\mu W/cm^2$ of 660nm light is used. It may be further appreciated that one hour of night interrupting light is nearly as effective as continuous illumination.

EXAMPLE II

Citrus (*Citrus Mitis*, Var. "Calamondin" Abscission)

Four calamondin trees having 30 fruits each were utilized as control plants, while four trees with 30 fruits each were used as the experimental plants. The subtropical climate of a region such as Florida was simulated by providing a temperature of 75° F. (25° C.) and a relative humidity of 55%.

The control plants received the regular daily light schedule (12 hours light, 12 hours dark), while the experimental plants also received the same daylight schedule but were exposed to 13 $\mu W/cm^2$, 660nm light during the dark period. In general, as shown in Table IV at the end of this description, the fruits on the plants exposed to the red light during the night required 20 to 30% less pull force than the control plants, experienced greater than 50% reduction in fruit plugs and peel injury, and underwent a substantial reduction in fruit drop while experiencing no leaf drop at all.

EXAMPLE III

Apples (*Malus Sylvestrus* 'Var. Rome Beauty')

Apple Fruit Abscission (*Malus Sylvestrus* 'Var. Delicious')

For each of two apple varieties (Rome Beauty and Delicious), 16 branches were excised from each of five trees approximately 1 week prior to harvest and clipped to lengths of approximately 20–30cm. The leaves were removed from the lower portions and the stems placed in flasks of tap water.

Three to four branches having an average of two to four apples were used per flask. Five to six flasks were used for each of the six different light treatments. Thus, each light condition had a sample size of approximately 40 to 50 apples. Controls were run in duplicate and received normal sunlight exposure.

The illuminated samples received the same daylight schedule but were exposed to six different narrow-band light sources (371nm, 420nm, 467nm, 550nm and 740nm) for 17 hours (3:30 P.M. to 8:30 A.M.). Light intensities were approximately 280 $\mu$W/cm$^2$ at apple level for all wavelengths. Fruit abscission was determined by periodically counting the number of apples dropped from the branches.

As shown in Table V at the end of this description, 420nm, 550nm and 660nm light most significantly delayed fruit abscission while 740nm light promoted it. Similar results were obtained with apple variety "Cortland".

As indicated earlier, it is additionally desirable at the end of the growing season to delay the abscission of apple leaves and thereby increase the quantity of formed buds to consequently increase the yield during the subsequent growth season. Accordingly, the data acquired on apple leaf defoliation, and shown in Table VI at the end of this description, indicates that the light sources at 467nm, 550nm and 660nm were effective in reducing defoliation. The light source at 750nm, on the other hand, caused more leaf abscission as compared to the control.

EXAMPLE IV

Soybeans

The premature drop of soybean flowers and fruits were retarded by night interruption with 15 minutes of 660nm light at an intensity of 25 $\mu$W/cm$^2$ for 14 days. As will be illustrated below, a 11.6% increase in fruit set was obtained along with a 42% reduction in the shedding of flowers and a 50% reduction in the shedding of fruit compared with the controls.

Six soybean plants (*Glycine Max* Var. 'Fiskby V'), each containing seven to eight nodes each and clusters of flower buds clearly visible on the apical portion of the plants were placed in each of 10 areas. The illuminated plants in five of the areas were interrupted with the 660nm light for 15 minutes nightly (12:30 P.M.-12:45 P.M.) for a period of 14 days. Plants in the remaining five areas received the same daylight schedule without the night interruption and were located as close to the lit areas as possible, but shaded during the night to prevent leakage of the 660nm light into the control areas. Biological data was collected before the start of the 14 day light treatment and daily during the light treatment. The number of flowers and fruits abscised per plant and the number of flowers and fruits developed per plant were recorded. Abscission counts were made twice daily at approximately 7:00 A.M. and 6:00 P.M.

Table VII at the end of this description is a compilation of the total results obtained for the 30 illuminated plants and the 30 control plants. It may be appreciated that the percentage of total new flowers developed by the illuminated plants during the 14 day period was 18.5% less than the control value, but the increased number of new flowers on the control plants were offset by the more pronounced abscission of the older flowers. It may be additionally appreciated that the night interruption enhanced the fruit set of the soybean plants by 11.6% over the control value.

Table VIII at the end of this description is a compilation of data derived from the illumination of soybeans with 660nm light and arranged to show the effect on the average plant, utilizing five replicates consisting of six plants each for the control and lighted conditions.

EXAMPLE VI

Cherries (*Prunus Cerasus* 'Var Lyons')

The loosening of cherries, raspberries, strawberries and similar non-climacteric fruit is highly desirable prior to mechanical harvesting.

As indicated in "Cherry Fruit Abscission" by Vernon A. Wittenbach, et. al., (54 *Plant Physiol.* 494–498), cherry plants undergo three growth stages hereinafter referred to as Stages A, B and C. Stage A typically occurs in May and is a period of fruit development. During this stage, an abscission zone is defined between the spur and pedicel. Premature drop of the fruit which may occur during this stage may be minimized by inhibiting the abscission process in the manner consistent with the foregoing techniques. Preferably, 660nm light of the appropriate intensity may be utilized. Stage B represents an intermediate growth period which occurs during the months of May and June. Stage C represents the ripening period in June-July and is characterized by the development of a second abscission zone between the fruit and the pedicel.

The ripening process of non-climacteric fruits differs from the climacteric fruits of the previous examples in that the hormone level within the plant responds to ethylene during Stages A and B but not Stage C.

Table VIII, below, shows the effects on cherry fruit pedicel abscission which resulted from the continuous illumination of the cherries during Stage C with light having an intensity of 280 $\mu$W/cm$^2$ at fruit level. Excised cherry branches carrying approximately 15–20 fruits per branch were immediately transferred to a beaker containing water and exposed to different narrow-band light treatments. Five to six branches were subjected to each light treatment indicated in Table IX while maintained at a temperature of 25° C. ± 1° and humidity of 40% ± 10%. As indicated in Table IX, red light (660nm) greatly enhances the abscission process during Stage C while the far red light (750nm) inhibits the abscission.

IX

The Effect of Light Sources on Cherry Fruit Pedicel Abscission

| Wavelength | Hrs. to 50% Abscission |
|---|---|
| Dark Control | 118 |
| Broad Spectrum Light | 99 |
| 371nm | 84 |
| 420nm | 46 |
| 460nm | 107 |
| 550nm | 84 |
| 660nm | 36 |
| 750nm | 247 |

TABLE V

The Effect Of Light Sources On Apple Fruit Abscission

| Treatment | (Rome Beauty) Hrs. To 50% Abscission | (Rome Beauty) Hrs. To 100% Abscission | (Delicious) Hrs. To 50% Abscission | (Delicious) Hrs. To 100% Abscission |
|---|---|---|---|---|
| Control | 387 | 1098 | 44 | 327 |
| 371nm |  |  | 184 | <400(>327) |
| 420nm | >1384 |  | 375 | <1280 |
| 467nm |  |  | 166.3 | >327 |
| 550nm | 456 | >1384 | 170 | >327 |
| 660nm | >1384 |  | 488 | >1280 |
| 740nm | 272 | 819 | 69 | 286 |

TABLE IV

The Effects Of 600nm Light On Citrus Abscission

| Measurements | Control (12L/12D)* 0 DAY | Control (12L/12D)* 15 DAYS | Control (12L/12D)* 30 DAYS | Illuminated (12L/12R)** 0 DAY | Illuminated (12L/12R)** 15 DAYS | Illuminated (12L/12R)** 30 DAYS |
|---|---|---|---|---|---|---|
| Pull Force (lb) | 3.93 ± 0.149 | 3.682 ± 0.185 | 1.8 ± 0.226 | 3.93 ± 0.149 | 2.818 ± 0.202 | 1.12 ± 0.232 |
| Plug % | 72.2 | 66.7 | 63.16 | 72.2 | 33.3 | 23.8 |
| Total Peel Injury % | 72 | 66 | 52.6 | 72 | 33 | 23.8 |
| Severe Peel Injury % | 38 | 33.3 | 47.4 | 38 | 8.3 | 4.7 |
| Leaf Loss % | 0 | 4 | 6 | 0 | 0 | 0 |
| Fruit Loss % | 0 | 13 | 7 | 0 | 5 | 6 |
| Average Fruit Wt. (g) |  | 15.645 ± 1.12 |  |  | 17.34 ± 1.5 |  |
| Fruit Color |  | Light Orange |  |  | Deep Orange |  |

*12L/12D = 12 Hours Cool White - Fluorescent Lights (770μW/cm²) Followed by 12 Hours of Dark
**12L/12R = 12 Hours of Cool White Fluorescent Lights (770μW/cm²) Followed by 12 Hours of Red Light (660nm; intensity 13μW/cm²) Exposure

TABLE VI

The Effect Of Illumination On Apple Leaf Abscission

| Treatment | (Rome Beauty) Total No. Of Leaves | (Rome Beauty) No. Of Leaves Abscised | (Rome Beauty) % Abscised | (Delicious) Total No. Of Leaves | (Delicious) No. of Leaves Abscised | (Delicious) % Abscission |
|---|---|---|---|---|---|---|
| Control I | 266 | 241 | 90.6 | 503 | 152 | 36 |
| Control II | 316 | 279 | 88.2 | 439 | 136 | 30.9 |
| 371nm |  |  |  | 568 | 179 | 31.5 |
| 420nm | 295 | 179 | 60.6 | 529 | 155 | 29 |
| 467nm |  |  |  | 455 | 98 | 21.5 |
| 550nm | 376 | 309 | 82 | 427 | 93 | 21.7 |
| 660nm | 274 | 151 | 55.1 | 484 | 88 | 18 |
| 740nm | 342 | 305 | 89.1 | 502 | 226 | 45 |

TABLE VII

Total effect of 600nm light on soybean flowers and pods.

| Treatment | Sample Size | Total No. of Flowers (Before the Start of Light Treatment) | Total No. of Flowers at the End of Light Treatment | Total No. of Flowers Abscised During the Light Treatment | % Flower Abscission | Total No. of Pods Developed During the Light Treatment | Total No. of Pods Left on Plants at the End of Light Treatment | Total No. of Pods Abscised | % Pod Abscission | % Flowers Developed into Pods |
|---|---|---|---|---|---|---|---|---|---|---|
| Control | 30 | 1380 | 2402 | 454 | 18.9 | 907 | 852 | 55 | 6.06 | 43.7 |
| Lighted Illuminated | 30 | 1433 | 2199 | 261 | 11.8 | 980 | 951 | 29 | 2.75 | 49.07 |

TABLE VIII
Average effect of 660 nm. light on soybean flowers and pods.

| | No. of Plants | Average No. of Flowers/Plants (Before Light Treatment) | Average No. of Flowers Per Plant at End of Light Treatment | Average No. of Flowers Abscised/Plant During Light Treatment | % Flower Abscission | Average Total No. of Pods Developed | Average No. of Pods Left Per Plant | Average Total No. of Pods Abscised Pod Plant | % Into Abscission | % Flowers Developed Pods |
|---|---|---|---|---|---|---|---|---|---|---|
| Control | 30 | 46± 1.4 | 80.27± 2.10 | 15.18± 1.39 | 18.9 | 30.26± 0.56 | 28.4± 0.8 | 1.84± 0.36 | 6.08 | 46.48 |
| Experimental Illuminated | 30 | 47.8± 1.2 | 73.26± 2.61 | 8.74± 0.84*** | 11.9 | 32.68± 0.87* | 31.7± 0.7** | 0.92± 0.28 | 2.7 | 52.60 |

\* = 0.05 ≧ P 0 > 0.01 (t - Test in comparison with control value)
\*\* = 0.01 ≧ P > 0.001 (t - Test in comparison with control value)
\*\*\* = 0.001 ≧ P (t - Test in comparison with control value)

IN GENERAL

The manner in which the explants were trimmed (Example I) has been specifically described. Under the test conditions imposed, the leaflets were generally absent in order to eliminate photosynthetic effects. Additional details concerning the illuminating system and the measurement of light values are provided. Though one may contend that different types of lamps emitting the same wavelengths can yield rather different results, such contention appears to be without foundation. The illuminating systems utilized in the present examples emit a narrow bandwidth about a predominate wavelength, such as 660nm or 740nm.

As to why 660nm was selected to retard the drop of soybean flowers and fruits, it is noted from the data that 660nm light produces the most pronounced effects on the abscission processes of other plants. Owing to the substantial facilities required for such investigations, 660nm light was selected owing to its preferred use, coupled with constraints on available lab space and equipment.

SUMMARY

From the foregoing examples, it may be appreciated that the abscission process of many plants may be controlled by the exposure of the plants for brief periods of time to light having appropriate intensities and wavelengths. It is envisioned that the abscission of agricultural crops may be accordingly controlled by means of mobile light sources mounted on tractors, mobile vans, or planes. The mobile sources would be capable of systematically covering the field with brief exposures to light having the appropriate wavelength and intensity to increase the yield of the crops grown therein.

It is understood that the subject matter disclosed in the present application includes information which was painstakingly derived from exhaustive laboratory experiments. While the methods utilized in the many examples have been chosen within constraints defined by laboratory space and the need for analytic data, it is obvious that other equivalent methods may be similarly utilized. These methods are within the spirit and scope of the present invention which is defined by the appended claims.

I claim:

1. A method for regulating the physiological abscission process of parts of plants comprising the step of illuminating the plant during the night period with narrow band light having a predominant wavelength selected from the group consisting of approximately 420nm, 550nm, 660nm and 740nm.

2. The method of claim 1 wherein the plant part is selected from the group consisting of bean petioles, leaves, soybean flowers and pods, citrus fruit, cherry fruit and apple fruit leaves.

3. The method of claim 1 wherein the night period is interrupted with the illumination.

4. The method of claim 1 wherein the light intensity is less than 300 $\mu W/cm^2$.

5. The method of claim 4 wherein abscission is inhibited in climacteric plants by illuminating the plants with light having a predominant wavelength selected from the group consisting of approximately 420nm, 550nm and 660nm prior to Stage II of its growth.

6. The method of claim 4 wherein abscission is promoted by illuminating climacteric plants during Stage II of their growth with light having a predominant wavelength selected from the group consisting of approximately 420nm, 550nm and 660nm.

7. The method of claim 4 wherein abscission is promoted in climacteric plants by illuminating the plant with approximately 740nm light.

8. The method of claim 4 wherein abscission is promoted in non-climacteric plants by illuminating the plants during Stage C with light having a predominant wavelength selected from the group consisting of approximately 420nm, 550nm and 660nm.

9. The method of claim 8 wherein the plant is cherry.

10. The method of claim 4 wherein abscission in the non-climacteric plants is inhibited by illuminating the plants during Stage A with light having a predominant wavelength selected from the group consisting of approximately 420nm, 550nm and 660nm.

11. The method of claim 1 wherein the abscission of soybean plant parts are inhibited by illuminating the plants with approximately 660nm light.

12. The method of claim 11 wherein the soybeans are illuminated at an intensity of approximately 25 $\mu W/cm^2$ for a night period of approximately 15 minutes.

13. The method of claim 1 wherein the abscission of calamondin fruit is promoted by illumination with approximately 660nm light at an intensity of approximately 13 $\mu W/cm^2$.